United States Patent Office 3,580,943
Patented May 25, 1971

3,580,943
DIBENZOCYCLOHEPTENE DERIVATIVES
Donald L. Trepanier, Indianapolis, Ind., assignor to The Dow Chemical Company, Midland, Mich.
No Drawing. Filed Sept. 3, 1968, Ser. No. 757,106
Int. Cl. C07c 121/64, 153/05, 159/00
U.S. Cl. 260—453                                          6 Claims

ABSTRACT OF THE DISCLOSURE

Dibenzocycloheptene derivatives such as methylthio 10,11 - dihydro - 5H - dibenzo(a,d)cycloheptene-$\Delta 5,\gamma$-butyrimidate and the hydrohalide salts thereof such as the hydroiodide and hydrobromide salts. The compounds are useful in the study of animal behavior and are particularly useful as central nervous system antidepressants and as agents for controlling the appetite of animals.

BACKGROUND OF THE INVENTION

Description of the prior art

The 5-(3-bromopropylidenyl)-5H-dibenzo(a,d)-cycloheptene employed as a starting material can be prepared by known methods such as are disclosed in the Journal of Organic Chemistry, 27, 4134 (1962) or Chemical Abstracts, 58, 3898 (1963). A typical method which can be employed is the Grignard reaction of 10,11-dihydro-5H-dibenzo(a,d) cyclohepten-5-one or 5H-dibenzo(a,d)cyclohepten-5-one with cyclopropylmethyl magnesium bromide.

SUMMARY OF THE INVENTION

This invention is directed to dibenzocycloheptene derivatives and is particularly directed to 5-substituted 5H-dibenzo(a,d)cycloheptene derivatives of the formula:

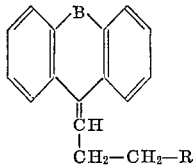

In the present specification and claims, B represents a vinylene(—CH=CH—) group or an ethylene (—CH₂—CH₂—) group, and R represents cyano, thiocarbamoyl

or alkylthiocarboximidate

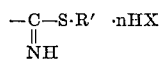

wherein R' represents methyl, ethyl or propyl, $n$ represents one of the integers zero or one, and HX represents hydrochloride, hydrobromide or hydroiodide. The novel compounds are crystalline solids which are of varying degrees of solubility in organic solvents such as benzene, acetone, ether and alcohols and only slightly soluble in water. The hydrohalide salts of the novel compounds are moderately soluble in water and alcohols and slightly soluble in organic solvents such as acetone, benzene and ether.

The novel compounds are useful for administration to laboratory animals in studying the behavior thereof and in studying drug effects on the central and peripheral nervous system. They are particularly useful as central nervous system antidepressants and as agents for controlling the appetite and food intake of animals. One compound, 10-11-dihydro-5H-dibenzo(a,d)-cycloheptene-$\Delta^{5,\gamma}$-butyronitrile is particularly useful as an appetite suppressant.

The compounds of the invention wherein R is cyano are prepared by the reaction of an alkali metal cyanide with a 5-(3-bromopropylidenyl)-5H-dibenzo(a,d)-cycloheptene corresponding to the formula:

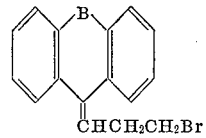

wherein B has the significance described above. The compounds wherein R is thiocarbamoyl ($CSNH_2$) are prepared by the reaction of hydrogen sulfide with the compounds wherein R is cyano, in the presence of a base. The compounds wherein R is alkylthiocarboximidate ($CNHSR' \cdot nHX$) are prepared by the reaction of a compound wherein R is thiocarbamoyl with an alkyl halide and the subsequent hydrolysis of the alkylthio 5H-dibenzo (a,d)-cycloheptene-$\Delta^{5,\gamma}$-butyrimidate hydrohalide in aqueous base to liberate the dibenzocycloheptene product as a free base.

The reaction of the 5-(3-bromopropylidenyl)-5H-dibenzo(a,d)cycloheptene with a alkali metal cyanide proceeds when the reactants are mixed together, preferably in an inert organic liquid as a reaction medium. Representative and suitable inert organic liquids which can be employed as reaction media include dimethylsulfoxide. The reaction proceeds readily at temperatures from about 10° to about 85° C. and is preferably carried out at a temperature of from about 40° to about 60° C. The proportions of the reactants to be employed are not critical; however, the use of a moderate excess of alkali metal cyanide is preferred. The reactants are preferably contacted by separately mixing each reactant with a portion of organic liquid reaction medium and thereafter mixing the liquid mixtures through the reaction mixture. The 5H-dibenzo(a,d)cycloheptent-$\Delta^{5,\gamma}$-butyronitrile product can be separated by conventional methods as extraction, evaporation or distillation. The product can be purified by conventional procedures such as recrystallization and washing. The product can be administered to animals, or it can be employed to prepare a dibenzocycloheptene derivative wherein R is thiocarbamoyl.

The reaction of the 5H-dibenzo(a,d)cycloheptene-$\Delta^{5,\gamma}$-butyronitrile compounds wherein R is cyano with hydrogen sulfide proceeds when the reactants are mixed together, preferably in a mixture of pyridine and an alkylamine as a reaction medium. Representative and suitable alkylamines which can be employed as reaction media include trimethylamine, triethylamine and n-propyldimethylamine. The reaction proceeds readily at temperatures from about 5° to about 75° C. and is preferably carried out at ambient temperatures. The proportions of the reactants to be employed are not critical; however, the use of an excess of hydrogen sulfide is preferred. The reactants are preferably contacted by passing excess hydrogen sulfide gas through the reaction mixture. The reaction should be carried out in a hood or other conventional means provided to carry off unreacted excess hydrogen sulfide. The thio-5H-dibenzo(a,d)cycloheptene - $\Delta^{5,\gamma}$-butyramide product can be separated by conventional methods as evaporation or distillation. The product can be purified by conventional procedures such as recrystallization and washing. The product can be administered to animals, or it can be employed to prepare a dibenzocycloheptene derivative wherein R is alkylthiocarboximidate.

The dibenzocycloheptene derivatives wherein R is alkylthiocarboximidate are prepared by the reaction of the dibenzocycloheptene compounds of the invention wherein R is thiocarbamoyl with an alkyl halide such as methyl bromide, ethyl chloride or propyl iodide. The reaction proceeds when the reactants are contacted and mixed, with the production of the product as a hydrohalide salt, the halogen of which corresponds to the halogen of the alkyl halide starting material. The reaction between the thio-5H - dibenzo(a,d)cycloheptene - $\Delta^{5,\gamma}$ - butyramide and the alkyl halide proceeds at temperatures from 0° to 50° C. and is preferably carried out at ambient temperatures. The reaction is preferably carried out in an inert organic liquid as a reaction medium. Representative inert organic solvents which can be employed as reaction media include acetone, methyl ethyl ketone, chloroform and dimethylformamide. The exact proportions of the reactants to be employed are not critical; however, the reaction consumes the reactants in equimolar proportions and the use of the reactants in such proportions is preferred. The reaction is generally complete within from about 12 to about 72 hours, depending on temperature. The product is separated by conventional procedures such as evaporation or distillation to remove the solvents, and can be purified by further conventional methods such as washing and recrystallization. The product is obtained as a hydrohalide salt and it can be administered directly to animals or converted to the free base.

The products wherein R is alkyl thiocarboximidate can be obtained as the free bases wherein $n$ is zero by careful neutralization of the corresponding hydrohalide salts in aqueous base such as aqueous sodium or potassium carbonate solution. The free base dibenzocycloheptene derivative is then separated by extraction with an organic solvent such as benzene, methylene chloride or chloroform, followed by evaporation of the solvent. The product can be purified by conventional methods such as recrystallization, or it can be converted to a different hydrohalide salt.

The hydrohalide salts of the dibenzocycloheptene derivatives can be prepared by dissolving the free base in a minimal amount of ether and adding an anhydrous acid such as hydrochloric, hydrobromic or hydroiodic acid or an ethereal solution of an acid such as hydrochloric acid, hydrobromic acid or hydroiodic acid until precipitation of the corresponding salt is complete. The salt can be further purified by conventional procedures such as recrystallization or washing, and the salt thus purified can be administered to animals. The salt can also be hydrolyzed to prepare the free base.

DESCRIPTION OF THE PREFERRED EMBODIMENTS

The following examples illustrate the invention but are not to be construed as limiting the same.

Example 1

95 grams (0.31 mole) of 5-(3-bromopropylidenyl)-5H-dibenzo(a,d)cycloheptene are dispersed in 375 milliliters of dimethylsulfoxide and the mixture is warmed to a temperature of 40° C. The warmed dispersion is then added to a stirred suspension of sodium cyanide (17 grams; 0.34 mole) in 175 milliliters of dimethylsulfoxide heated to a temperature of 60° C. The addition is carried out over a period of 15 minutes. When the addition is complete, the mixture is held at room temperature for one hour and is then diluted with water. The aqueous mixture is extracted with four 250 milliliter portions of ether. The ether extracts are combined, washed with water and aqueous sodium chloride, dried over anhydrous magnesium sulfate, and evaporated. The product is obtained as a solid evaporation residue. The solid 5H-dibenzo(a,d)cycloheptene-$\Delta^{5,\gamma}$-butyronitrile product is recrystallized four times from isopropanol and found to melt at 113.5°–115° C. The product is found by analysis to have carbon, hydrogen and nitrogen contents of 88.7, 5.9 and 5.4 percent, respectively, as compared with the theoretical contents of 88.8, 6.0 and 5.3 percent, respectively, calculated for the named structure.

In substantially the same procedure described above and employing dimethylsulfoxide as a reaction medium 10,11 - dihydro - 5H - dibenzo(a,d)cycloheptene-$\Delta^{5,\gamma}$-butyronitrile is prepared by employing 13 grams (0.042 mole) of 5 - (3 - bromopropylidenyl)-10,11-dihydro-5H-dibenzo(a,d)cycloheptene and 2.3 grams (0.046 mole) of sodium cyanide, heating the reaction mixture for one hour at 60°–70° C., and holding the mixture overnight at ambient temperatures. The reaction mixture is diluted with water, extracted with ether, and the extract is washed with water and aqueous sodium chloride. The ether extract is dried and evaporated to leave the product as a residue. The solid 5H-dibenzo(a,d)cycloheptene-$\Delta^{5,\gamma}$-butyronitrile product is recrystallized twice from isopropanol and found to melt at 91°–92.5° C. The structure of the product is confirmed by infrared and nuclear magnetic resonance spectroscopy.

Example 2

10 grams (0.39 mole) of 10,11 - dihydro-5H-dibenzo(a,d)cycloheptene-$\Delta^{5,\gamma}$-butyronitrile are dispersed in a mixture of 50 milliliters of pyridine and 20 milliliters of triethylamine, and the dispersion is stirred at room temperature while excess hydrogen sulfide gas is added to the mixture. Addition of hydrogen sulfide is continued by bubbling the gas through the mixture for 1.3 hours. The mixture is diluted with 600 milliliters of water and extracted with four 100 milliliter portions of chloroform. The combined chloroform extracts are washed with water and dried over anhydrous magnesium sulfate, after which they are evaporated in vacuo. The solid evaporation residue is chromatographed on an alumina column with elution by a mixture of chloroform and benzene. After the chloroform and benzene eluant leaves the column, the column is eluted with ether. The ether fractions are evaporated to leave the product as a residue. The solid 10,11-dihydrothio - 5H - dibenzo(a,d)cycloheptene-$\Delta^{5,\gamma}$-butyramide product is recrystallized once from a mixture of isopropanol and pentane and once from isopropanol and found to melt at 130°–131.5° C. The product is found by analysis to have hydrogen and sulfur contents of 6.8 and 10.8 percent, respectively, as compared with the theoretical contents of 6.5 and 10.9 percent, respectively, calculated for the named structure. The structure of the product is confirmed by infrared spectroscopy.

In substantially the same procedure described above and employing similar inert organic solvents, thio-5H-dibenzo(a,d)cycloheptene - $\Delta^{5,\gamma}$ - butyramide, having a molecular weight of 291, is prepared by the reaction of 5H - dibenzo(a,d)cycloheptene-$\Delta^{5,\gamma}$-butyronitrile with excess hydrogen sulfide in the procedure described above.

Example 3

The 10,11 - dihydrothio-5H-dibenzo(a,d)cycloheptene-$\Delta^{5,\gamma}$-butyramide of Example 2 (13.5 grams; 0.046 mole) is mixed with methyl iodide (6.5 grams; 0.046 mole) and 75 milliliters of acetone. The reactants and the acetone are mixed thoroughly and are then held at room temperature for about eighteen hours. The mixture is then evaporated in vacuo and the residue is triturated with ether. The ether is removed by filtration to leave the product as a crystalline solid filter cake. The methylthio 10,11-dihydro - 5H - dibenzo(a,d)cycloheptene-$\Delta^{5,\gamma}$-butyrimidate hydroiodide product is washed with ether, recrystallized from isopropanol and found to melt at 150°–153° C. with decomposition. The product is found by analysis to have carbon, hydrogen and sulfur contents of 55.4, 5.2 and 7.3 percent, respectively, as compared with the theoretical contents of 55.2, 5.1 and 7.4 percent, respectively, calculated for the named structure. The product is mixed with a mixture of methylene chloride and water and the mixture is made basic to a pH of about 8 by the addition of aqueous potassium carbonate solution. The organic layer is decanted off and separated and evaporated in vacuo to leave the free base methylthio 10,11-dihydro-5H-dibenzo(a,d)cycloheptene - $\Delta^{5,7}$ - butyrimidate, having a molecular weight of 307, as a residue. The methylthio 10,11 - dihydro - 5H - dibenzo(a,d)cycloheptene-$\Delta^{5,7}$-butyrimidate is dissolved in about 10 milliliters of ether and excess anhydrous hydrogen bromide is added to the solution until precipitation is complete. The mixture is filtered and the methylthio 10,11-dihydro - 5H - dibenzo (a,d)cycloheptene-$\Delta^{5,7}$-butyrimidate hydrobromide, having a molecular weight of 388, is obtained as a filter cake.

In substantially the same procedure, and employing similar solvents, the following are prepared:

Ethylthio 10,11-dihydro-5H-dibenzo(a,d)cycloheptene-$\Delta^{5,7}$-butyrimidate hydroiodide, having a molecular weight of 449, is prepared by mixing together equimolar proportions of 10,11-dihydrothio-5H-dibenzo(a,d)cycloheptene-$\Delta^{5,7}$-butyramide and ethylbromide in methylethyl ketone and holding the mixture at 30° C. for from 12 to 18 hours. The product is separated by evaporation to remove the solvent and hydrolyzed with aqueous sodium hydroxide solution to obtain the free base.

Propylthio 5H - dibenzo(a,d)cycloheptene-$\Delta^{5,7}$-carboximidate hydrochloride, having a molecular weight of 369.5, is prepared by employing propyl chloride and thio-5H-dibenzo(a,d)cycloheptene - $\Delta^{5,7}$ - butyramide in the above procedure.

Methylthio 5H - dibenzo(a,d)cycloheptene-$\Delta^{5,7}$-butyrimidate hydroiodide, having a molecular weight of 433 and melting with decomposition at 192° C., is prepared by mixing together equimolar proportions of thio-5H-dibenzo(a,d)cycloheptene-$\Delta^{5,7}$-butyramide and methyliodide in acetone and holding the mixture at room temperature for 18 hours. The structure of the product is confirmed by infrared spectroscopy. The product is hydrolyzed with aqueous sodium hydroxide solution to obtain the free base, methylthio-5H-dibenzo(a,d)cycloheptene-$\Delta^{5,7}$-butyrimidate, having a molecular weight of 310.

The compounds of the invention can be administered to animals in the study of the behavior thereof and in the study of drug effects on the central and peripheral nervous systems thereof. The compounds are typically administered to animals at antidepressant or appetite suppressant dosages from about 50 milligrams or less of dibenzocycloheptene derivative per kilogram of animal body weight to as high as about 500 milligrams or more per kilogram of animal body weight, depending upon the particular compound employed and upon such factors as age, species, size and physical condition of the animal, route and frequency of administration and the effect to be produced. The compounds are preferably administered as compositions comprising one or more dibenzocycloheptene derivatives of the invention and one or more pharmaceutical excipients including inert diluents, dispersing agents, binders, wetting agents or the like. They can be administered orally in the form of tablets, elixirs, emulsions, suspensions or the like, or by injection in the form of sterile injectable solutions or suspensions.

The dibenzocycloheptene derivatives have pharmacological utility as indicated by their potentiation barbiturate-induced sedation in small rodents. In representative operations, separate groups of mice receive a dosage of 10,11 - dihydro - 5H - dibenzo(a,d)cycloheptene-$\Delta^{5,7}$-butyronitrile at a rate of 464 milligrams of test compound per kilogram of animal body weight by intraperitoneal injection. One hour later, hexobarbital is administered by intraperitoneal injection at a dosage rate of 100 milligrams per kilogram. Separate groups of untreated mice are similarly injected with hexobarbital at a dosage rate of 100 milligrams per kilogram to serve as checks. The hexobarbital injections induce sleep in the mice, and the animals are placed on their backs and observed until each mouse turns over and rights itself. The mice administered 10,11-dihydro-5H-dibenzo(a,d)cycloheptene-$\Delta^{5,7}$-butyronitrile are observed to sleep more than twice as long as the untreated check mice. In other operations involving aggregation of amphetamine-treated mice in small cages, 10,11 - dihydro-5H-dibenzo(a,d)cycloheptene-$\Delta^{5,7}$-butyronitrile thioamide and methylthio 5H-dibenzo(a,d) cycloheptene-$\Delta^{5,7}$-butyrimidate hydroiodide, when administered to separate groups of mice by intraperitoneal injection at dosage rates of 204 and 65 milligrams per kilogram 30 minutes prior to the administration to the mice of 5 milligrams of amphetamine per kilogram, are found to potentiate the symptoms of hyperexcitement, hyperactivity, irritability and fighting which are induced in mice by administration of amphetamine.

I claim:
1. A compound corresponding to the formula:

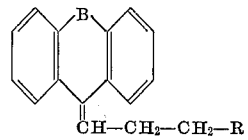

wherein B represents vinylene or ethylene and R represents thiocarbamoyl corresponding to the formula —CSNH$_2$, or alkylthiocarboximidate corresponding to the formula CNHSR'·nHX, in which n represents zero or one, HX represents hydrochloride, hydrobromide or hydroiodide and R' represents methyl, ethyl or propyl.

2. A compound of claim 1 wherein B is vinylene and R is alkylthiocarboximidate.

3. A compound of claim 2 wherein R' is methyl and HX is hydroiodide.

4. A compound of claim 1 wherein B is vinylene.

5. A compound of claim 1 wherein B is ethylene.

6. A compound of claim 1 wherein R is alkylthiocarboximidate and n is one.

References Cited

UNITED STATES PATENTS

| | | | |
|---|---|---|---|
| 3,366,660 | 1/1968 | Davis et al. | 260—453 |
| 3,372,196 | 3/1968 | Englehardt | 260—570.8 |

OTHER REFERENCES

Chemical Abstracts, vol. 66, p. 8014, Abstract 85652Z, May 1967.

LEWIS GOTTS, Primary Examiner

D. G. RIVERS, Assistant Examiner

U.S. Cl. X.R.

260—465, 551; 424—298, 304, 324